United States Patent [19]

Stark

[11] Patent Number: 4,487,659
[45] Date of Patent: * Dec. 11, 1984

[54] SOLAR DISTILLATION APPARATUS

[75] Inventor: Virgil Stark, New York, N.Y.

[73] Assignee: North American Utility Construction Corp., New York, N.Y.

[*] Notice: The portion of the term of this patent subsequent to Jun. 2, 1998 has been disclaimed.

[21] Appl. No.: 200,019

[22] Filed: Oct. 23, 1980

Related U.S. Application Data

[63] Continuation-in-part of Ser. No. 44,901, Jun. 4, 1979, Pat. No. 4,323,052, which is a continuation-in-part of Ser. No. 1,175, Jan. 5, 1979, abandoned, which is a continuation-in-part of Ser. No. 915,001, Jun. 13, 1978, Pat. No. 4,270,981, and Ser. No. 920,288, Jun. 29, 1978, Pat. No. 4,289,118.

[51] Int. Cl.³ .................................................. C02F 1/14
[52] U.S. Cl. .................................. 202/172; 202/173; 202/176; 202/177; 202/180; 202/233; 202/234; 202/202; 202/267 A; 126/435; 126/440; 159/1 S; 203/10; 203/22; 203/23; 203/25; 203/100; 203/DIG. 1; 203/86
[58] Field of Search ................... 203/DIG. 1, 100, 10, 203/11, 99, DIG. 17, 22, 23, 25, 86; 202/234, 176, 177, 180, 232, 233, 202, 235, 267, 172, 173; 159/1 S, 1 SF; 126/440, 435

[56] References Cited

U.S. PATENT DOCUMENTS

| 4,134,393 | 1/1979 | Stark et al. | 203/DIG. 1 |
| 4,194,949 | 5/1980 | Stark | 203/DIG. 1 |
| 4,270,981 | 6/1981 | Stark | 203/DIG. 1 |
| 4,312,709 | 1/1982 | Stark et al. | 203/DIG. 1 |
| 4,323,052 | 4/1982 | Stark | 203/DIG. 1 |

OTHER PUBLICATIONS

B. E. Swaidan & Eugene E. Cooper "Highly Efficient Solar Still" Navy Tech. Disclosure Bulletin, vol. 4, No. 5, May 1979, pp. 21-26.

Primary Examiner—Wilbur Bascomb
Attorney, Agent, or Firm—Kenyon & Kenyon

[57] ABSTRACT

Solar distillation apparatus is disclosed in which the released heat of condensation of the condensing liquid is recovered in a transparent conduit disposed over the liquid to be distilled. Solar energy passes through the transparent conduit and is received on an undulated plate system over which the liquid to be distilled is conducted. A cooling fluid is circulated through the conduit to absorb heat released by the condensing liquid. In one embodiment, the conduit does not concentrate the solar energy. The conduit is preferably disposed at an angle of up to about 25° with the horizontal so that the system is subjected to minimal pressure. In another embodiment the conduit defines a fluid lens system which concentrates the solar energy on the plate system. Provision is also made to recover heat from the condensate and a concentrate of the liquid to be distilled.

40 Claims, 5 Drawing Figures

SOLAR DISTILLATION APPARATUS

RELATED APPLICATIONS

This application is a continuation-in-part of my copending application Ser. No. 44,901 filed June 4, 1979 (now U.S. Pat. No. 4,323,052), which is a continuation-in-part of Ser. No. 1,175 filed Jan. 5, 1979, now abandoned, which is a continuation-in-part of my copending applications Ser. Nos. 915,001, filed June 13, 1978 (now U.S. Pat. No. 4,270,981) and 920,288, filed June 29, 1978 (now U.S. Pat. No. 4,289,118), the disclosures all of which are hereby incorporated by reference.

BACKGROUND OF THE INVENTION

This invention relates to solar energy systems in general and more particularly to solar energy distillation systems.

In U.S. Pat. No. 4,134,393, issued on Jan. 6, 1979, of which I am a co-inventor, in U.S. Pat. No. 4,194,949 issued on Mar. 25, 1980, of which I am sole inventor, in U.S. Pat. No. 4,210,121 issued on July 1, 1980, of which I am sole inventor, and in pending Application Ser. No. 807,513 filed June 20, 1977, now abandoned, of which I am sole inventor, solar energy distillation apparatus are disclosed in which a part of the heat of condensation of the condensing liquid is recovered. In the disclosed embodiments in those patents and in that application, the heat of condensation is transferred to a fluid in a fluid lens disposed over the liquid to be distilled which includes an inclined bottom surface on which the evaporated liquid is condensed and along which the condensed liquid flows to be discharged from the lower end thereof. The '949 and '121 patents and the '513 application also disclose recovering heat from the condensate and from a concentrate (brine) of the liquid being condensed.

It is generally undesirable to incline a fluid lens at more than an angle of about 25° in order to maintain the fluid pressure in the lens at a level which does not require a high pressure lens construction. However, at locations where a lens inclination of greater than 25° is desirable to increase collection, a fluid lens inclined only at 25° operates at reduced efficiency.

In application Ser. No. 915,001, filed June 13, 1978, now U.S. Pat. No. 4,270,981, solar distillation apparatus is disclosed comprising conduit means interposed between lens means for concentrating the solar energy and the liquid to be distilled. Solar energy is concentrated by lens means in the liquid to be distilled through the conduit means. In one embodiment, the conduit means comprise a double plate conduit having an upper and a lower plate between which a heat exchange fluid flows. The concentrated solar energy causes the liquid to evaporate with the vapor impinging and being condensed upon the lower surface of the lower plate of the double plate conduit, the condensed liquid flowing along the lower surface of the lower plate to the lower end thereof and falling therefrom into a container, a substantial part of the heat of condensation of the condensing vapor being absorbed by the fluid in the double plate conduit means.

According to embodiments of Ser. No. 915,001, now U.S. Pat. No. 4,270,981, the lens means comprise a plurality of sets or series of Fresnel-type lenses arranged to provide elongated narrow foci. The container includes a plurality of baffles dividing the container interior into a plurality of distillation compartments for the liquid to be distilled and is inclined so that the compartments are offset in height. The bottom of the compartments containing the liquid to be distilled may be blackened to allow absorption of solar energy and enhance the heating of the liquid. The elongated foci of the lenses may be located in and along a different compartment or they may extend transversely to the compartments.

As disclosed in Ser. No. 915,001, now U.S. Pat. No. 4,270,981, an expansion tank for the heat exchange fluid in the double plate conduit is located so as to provide minimal pressure within the double plate conduit. A heat exchanger is also provided to transfer the heat recovered in the heat exchange fluid circulated in the double plate conduit to the liquid being introduced into the container to preheat the liquid. The heat exchanger is also located to minimize pressure in the double plate conduit.

As disclosed in Ser. No. 44,901, now U.S. Pat. No. 4,323,052, an undulated plate system is provided over which the liquid to be distilled is conducted. A single panel or plurality of adjacent panels made of blackened flexible plastic or the like, such as isobutyl, may be disposed over all or part of the plate system. The panel or panels are attached in the plate system in a removable manner which will permit removal thereof in order that deposits which may form on the panel(s) can be removed.

According to Ser. No. 44,901, now U.S. Pat. No. 4,323,052, it is preferred that the undulated plate system be placed above the focal area of maximum concentration obtained from Fresnel-type lens concentrators. This permits a wider spread of the energy converging from the lenses on the undulated plate system so that a wider area of the plate system is heated. A double plate conduit is interposed between the plate system and the lens. The fluid circulating in the double plate conduit is allowed to spread along the surface of the plates comprising the double plate conduit and is regulated, thus controlling the temperature of the fluid.

According to Ser. No. 44,901, now U.S. Pat. No. 4,323,052, photovoltaic cells can be installed in one or more bottoms or valleys of the undulated plate system at the locations where the energy is concentrated by the Fresnel-type lenses. The photovoltaic cells can be encapsulated in a transparent plastic or glass cover so as to protect the cells from the liquid being distilled. The cells can also be enclosed in a transparent tube in which distilled liquid such as cooled condensate produced by a distillation unit can circulate and further absorb heat generated by the infrared rays. Such a heat exchange can reduce the temperature of the condensate.

Infrared rays can be absorbed by the fluid in the double plate conduit means (Ser. Nos. 915,001, now U.S. Pat. No. 4,270,981 and 44,901, now U.S. Pat. No. 4,323,052, ) by the fluid circulated around the photovoltaic cells (Ser. No. 44,901, now U.S. Pat. No. 4,323,052 and U.S. Pat. No.. 4,134,393) and by the fluid circulated through a fluid lens (U.S. Pat. Nos. 4,210,121 and 4,194,949 and Ser. No. 807,513, now abandoned), for example, to maintain the temperature of the cells lower.

In Ser. No. 44,901, now U.S. Pat. No. 4,323,052 provisions are made to recirculate the liquid conducted over the undulated plate system both during the day and night and on days without sunshine. In the case of distilling sea water, the brine obtained at the output of the distillation apparatus will typically be at a temperature of 80° C. and its quantity will be for instance eight times as large as the water vaporized by solar energy alone. Furthermore, as disclosed in U.S. Pat. No. 4,194,949 and Ser. No. 915,001, now Pat. No. 4,270,981, larger quantities of the fluid carried in the conduit against which the evaporated water condenses are required to maintain condensation and carry away that heat. Through recycling of the brine, salt can be extracted therefrom with an increased salt content after several recyclings.

Ser. No. 44,901, now Pat. No. 4,323,052, also provides for storing the fluid circulating in the conduit means, the brine and the condensate, all in selected quantities, in the space below an insulated panel on which the undulated plate system rests. By storing these fluids beneath the insulated panel, further insulation is provided reducing heat losses.

In the aforementioned patents and applications, either a fluid lens or a conduit disposed between a concentrating lens and the liquid to be distilled is used to condense evaporated liquid, the fluid lens and the conduit means being supplied with a fluid which assists in condensing evaporated liquid.

Typically, when a concentrating lens is used, the lens is oriented to face the sun and can be situated at an angle of 45°, for example. Additionally, while concentrating solar energy, a lens introduces a transmission loss which can be in the order of 20%. To this must be added losses resulting from the structure supporting the lens. Moreover, a lens such as a Fresnel-type lens typically collects only direct solar energy and not diffuse solar energy which can account for about 10% to about 30% of the total irradiation.

SUMMARY AND OBJECTS OF THE INVENTION

It is an object of the present invention to distill liquids utilizing solar energy without concentrators.

It is another object of the present invention to distill liquids utilizing solar energy while recovering the heat of condensation released by the condensing distilled liquid.

It is another object of the present invention to distill liquids while collecting diffuse solar energy as well as direct solar energy.

It is another object of the present invention to distill liquids utilizing solar energy while recovering heat from the condensed liquid and/or a concentrate of the liquid being distilled.

It is another object of the present invention to distill liquids without tracking the sun and/or without disposing the solar distillation apparatus inclined so as to be normal to the direct solar energy.

It is another object of the present invention to distill liquids while recovering the heat of condensation of the condensing liquid without operating under high pressures.

It is another object of the present invention to provide an improved fluid lens which is particularly useful in solar distillation apparatus.

In accordance with the invention disclosed herein, apparatus is provided for distilling liquids in which a conduit means transparent to visible light is disposed above a means for conducting the liquid to be distilled so as to allow the solar energy to pass through the conduit means and be received in or on the means for conducting, the conduit means being supplied with a fluid which can cool the conduit means and thereby assist in condensation on the conduit means of liquid evaporated from the means for conducting. The conduit means transfers heat released from the condensing liquid to the fluid in the conduit means so as to enable recovery of a substantial portion of the heat of condensation of the condensing liquid. In the disclosed embodiments, the conduit means are generally coextensive with the means for conducting.

As disclosed herein, the conduit means comprises at least one plate which is transparent to visible light and which is disposed above the means for conducting. The conduit means include means for admitting and withdrawing fluid from the conduit means so that a thin flow of fluid through the conduit means can be established.

In one embodiment, the conduit means comprises a single plate and means are provided about the perimeter of the plate to form an enclosure through which fluid can flow.

In another embodiment, the conduit means comprises a double plate conduit having upper and lower plates transparent to visible light, the upper and lower plates being spaced to permit a thin flow of fluid therebetween.

The single plate of the conduit means or the lower plate of the conduit means is disposed above the means for conducting so as to provide a space therebetween. Preferably, means are also provided in cooperation with the conduit means for closing off the space above the means for conducting.

In one embodiment of the double plate conduit, the two plates are spaced by a distance corresponding to the thickness desired of the fluid flowing through the conduit means. In another embodiment, the opposed plates are spaced by a distance which exceeds the desired thickness of the fluid which flows through the conduit means. In the latter embodiment, the upper plate may be disposed so as to receive and condense liquid evaporated from a liquid flowing through the conduit means. Means are provided to collect this condensate.

The opposed plates which comprise the double plate conduit may be parallel or may form an acute angle. In either case, means are provided to form an enclosure of the opposed plates.

In accordance with one aspect of the invention, the plates are spaced by a distance which exceeds the thickness of the fluid flowing through the plates so that it is not necessary to construct the conduit to withstand high pressures. Correspondingly, where only a single plate comprises the conduit means, the conduit means also does not have to withstand high pressures.

In accordance with one aspect of the invention, the means for conducting comprises an undulated system. The undulated system is disposed at an acute angle with the horizontal and the conduit means are disposed at an acute angle with the horizontal. The angles at which the undulated system and the conduit means are disposed may be equal or unequal to each other. The angles are selected in accordance with the location of the apparatus and the season of the year, and in accordance with the maximum pressure at which it is desired to operate the conduit means. In other words, the angles are not solely dependent upon the location and season which would otherwise dictate that the apparatus be inclined so as to be normal to the sun's rays for the particular location and season.

In accordance with another aspect of the invention, the solar distillation apparatus includes means for collecting the condensed liquid, the liquid conducted over the means for conducting and the fluid passed through the conduit means.

In accordance with another aspect of the invention one or more of the means for collecting may be disposed below the means for conducting.

In accordance with another aspect of the invention, heat exchange means can be provided to recover the heat in the condensate, a concentrate of the liquid to be distilled, and the fluid conducted through the conduit means. The recovered heat can be used to heat the liquid to be distilled.

In accordance with still another aspect of the invention, means are provided for conducting fluid which has been circulated through the conduit means in a heat exchanging relationship with the means for conducting. Heat contained in that fluid can thus be transferred to the liquid to be distilled.

In accordance with another aspect of the invention, the conduit means can comprise opposed plates spaced and supported by elongated supports. The elongated supports are spaced so as to form in cooperation with the opposed plates, individual conduits which can conduct a cooling fluid.

According to another aspect of the invention, the conduit means is structured to provide a "go-return" flow of fluid through the conduit means.

In accordance with yet another aspect of the invention, a conduit means may comprise fluid lens means for concentrating the solar energy on the means for conducting. The fluid lens means in accordance with the invention comprises a plurality of fluid lenses each having a focus and each being disposed above said means for conducting so that each said focus is located on or below said means for conducting. In the disclosed embodiments, the fluid lens means comprises a planar lower plate and an upper plate having a plurality of elongated, adjacently disposed convex portions, the upper and lower plates being spaced. Elongated, preferably transparent supports may be disposed between the upper and lower plates extending parallel to sides of adjacent convex portions. Each convex portion together with a portion of the bottom plate and associated supports, where utilized, forms a conduit through which cooling fluid can flow.

The lower plate of the conduit means and the fluid lens means transfers heat released by the condensing liquid so as to enable recovery of the heat of condensation released by the condensing liquid.

In accordance with another aspect of the invention, an array of photovoltaic cells can be disposed on the means for conducting at a location to receive concentrated solar energy from the fluid lens means.

In the disclosed embodiment, the liquid to be distilled comprises water, typically sea water. Advantageously, the fluid passed through the conduit means comprises distilled water, preferably the condensate of the water being distilled.

According to another aspect of the invention, the fluid passed through the conduit means can comprise liquid to be distilled, the conduit means comprising plates spaced by a distance exceeding the thickness of the liquid flowing through the conduit means, with the upper plate receiving liquid vapor thereon and condensing the same. The condensed liquid is then collected so as to provide additional condensate.

According to the embodiments of the invention which do not include a lens, substantially all of the solar energy impinging on the conduit means is transferred through the conduit means and the fluid passing through the conduit means to the liquid being distilled, less the transmission losses of the conduit means and the fluid therein. Since only a predetermined amount of solar energy impinges upon a given area, essentially no solar energy is lost by operating without a concentrator. Moreover, the elimination of the concentrator reduces losses, for example, transmission losses associated with the concentrator. An additional advantage realizable according to the invention is the collection of diffuse solar energy which is typically not collected by concentrators. Still another advantage which is realized in accordance with the invention is the ability to operate the system at reduced pressures in that the system need not be disposed at high angles of for example 45°. This is possible because systems according to the invention collect solar energy efficiently without the need to orient the system to be normal to the rays of the sun.

These and other aspects of the present invention will be more apparent from the following description of the preferred embodiments thereof when considered with the accompanying drawings.

BRIEF DESCRIPTION OF THE DRAWINGS

The present invention is illustrated by way of example and not limitation in figures of the accompanying drawings in which like references indicate similar parts and in which.

DESCRIPTION OF THE PREFERRED EMBODIMENTS

Figure 1:
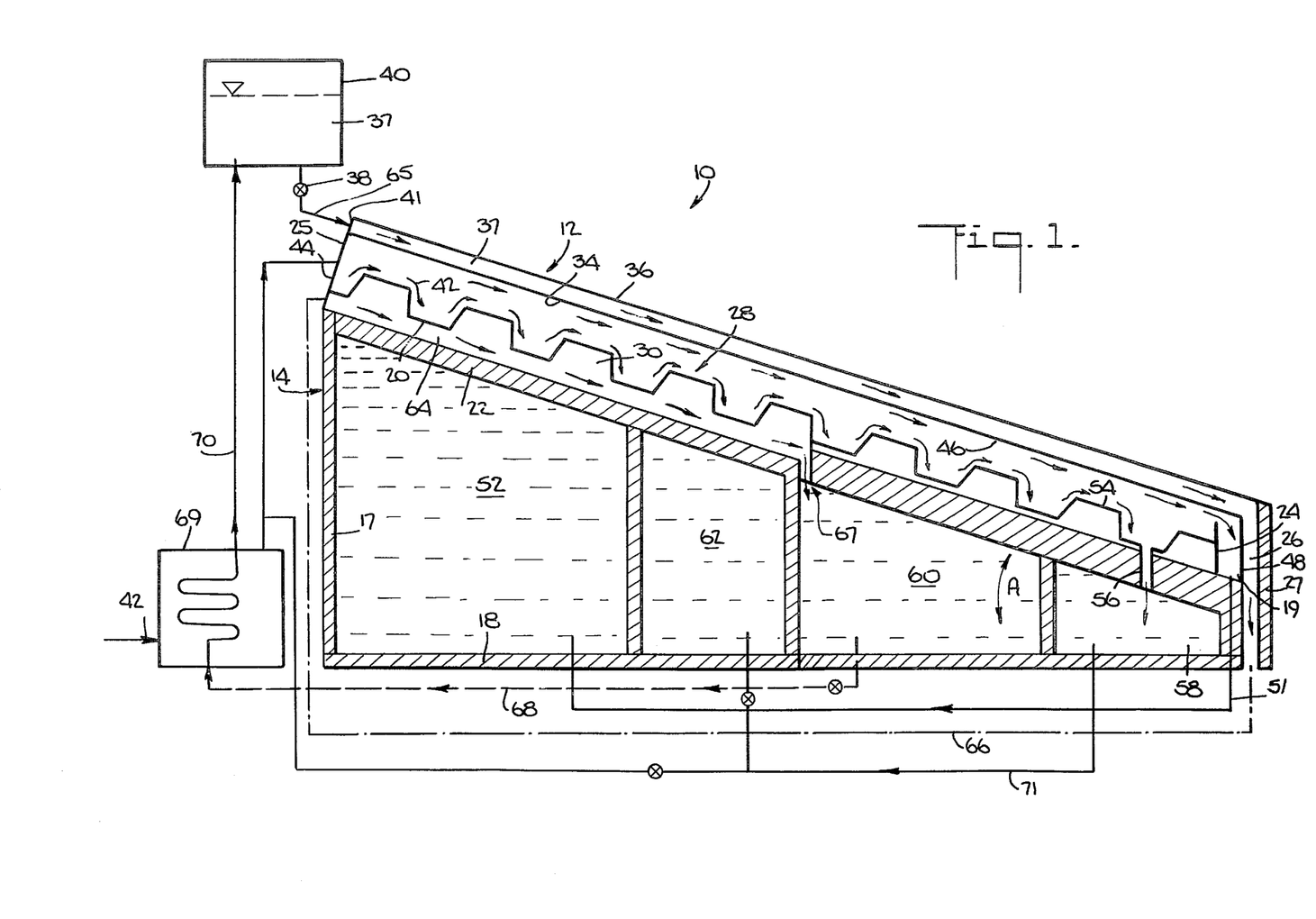
FIG. 1 is a cross-sectional elevation view through distillation apparatus according to the present invention.

Referring now more particularly to the drawings, FIG. 1 illustrates solar distillation apparatus 10 according to one embodiment of the invention for distilling salt water. Apparatus 10 includes a double plate conduit system 12 supported by a base structure 14, having a front wall 17, a bottom wall 18 and a rear wall 19. On the base structure 14 is disposed conducting means 20 including an insulating base member(s) or panel(s) 22 which rests on walls 17 and 19. The means for conducting includes a bottom end wall 24 and a top end wall 25. The means for conducting 20 will, of course, have appropriate side walls, not shown in FIG. 1. The double plate conduit system 12 is supported by the base structure rear wall 19 and the conducting means upper wall 25. The double plate conduit includes an outlet conduit 26 formed by wall 19 and a member(s) or panel(s) 27. Disposed on top of the insulating base member 22 is an undulated plate system 28 which can be made from a single plate or from a plurality of plates. The height of each of the undulations 30 can be for example 90 mm (about 3.5 inches). The distance between undulations can be for example 120 mm (about 5 inches). The plate(s) of the plate system is preferably made out of metal such as steel, stainless steel or copper, having a thickness of, for example 1 mm. It is preferred that the upper surface of the plate system be covered by a black paint or chrome black. The paint or other agents should be made of an anticorrosive material and provisions should be made, if necessary, to provide cathodic protection for the metal structure to prevent damage which could result from electrical currents caused by the reaction between the metal surface and the existing chemicals in an electrolytic solution in the water. As an alternative to metal, undulated asbestos fiber, glass or plastic plate can be used. However, metal is preferred as it will relatively uniformly conduct heat to all sides of the plate system.

The double plate conduit 12 includes a lower plate 34 and a spaced upper plate 36 which are sealed to form the conduit. The space between the plates is shown exaggerated for clarity. One or more openings are provided at each end of the double plate conduit in order to admit and withdraw fluid 37 from the conduit so as to allow for circulation of the fluid through the conduit 12. The openings may be provided by partially obstructed the space along the extreme ends of the plates with silicone or other means, leaving small outlets for passage of the fluid. This is done so as to allow the fluid to spread in a thin layer substantially over all the interior surface area of the plates 34 and 36. A valve 38 at the upper end of the double plate system permits selective control of the flow of the fluid from a tank 40. The fluid will flow to the inlet 41 of the double plate conduit from the tank 40, which is at a height of, for example, 40 cm (about 17 inches) above the conduit 12 so as to allow minimal pressure between the plates 34 and 36.

The double plate conduit 12 and the conducting means are inclined at an angle, A. As shown, the conduit 12 and the conducting means are parallel. However, the conduit could be at an angle slightly greater than the means for conducting so as to provide for a larger volume between the conduit and the means for conducting. In general, angle A is selected so that the double plate conduit and the conducting means are inclined up to a maximum angle of about 25° with the horizontal. In certain locations and during certain seasons, when at an angle of 25°, the double plate conduit and the conducting means are normal to the rays of the sun. In other locations, and during other seasons, when the conduit and conducting are at an angle of 25°, the rays of the sun will not be normal to the conduit and the means for conducting but will strike them at some angle. However, the rays will nonetheless be incident upon the conduit and the means for conducting and will therefore be collected. Accordingly, the angle of approximately 25° is selected so as to reduce the amount of pressure required to circulate the fluid through the conduit 12 and correspondingly the conduit 12 does not have to be constructed so as to withstand high pressures. For example, disposing the system at an angle of 25° instead of 45° provides for a reduction of pressure of water circulating between the plates of the double plate conduit 12 from about 130 cm to about 70 cm of water.

Salt water 42 is supplied to the means for conducting 28 via conduit 43 and opening 44 in the end wall 25. The salt water cascades over the undulations 30 and receives the solar energy transmitted through the double plate conduit 12. The salt water conducted over the means for conducting is heated and evaporated, and impinges upon the lower plate 34 of the double plate conduit system 12. Condensate 46 runs down the lower surface of the lower plate 34 and is collected in compartment 48 formed by walls 19 and 24 from which it flows through an opening 50 and a conduit 51 to a compartment 52 located below the insulating base member 22. Brine 54 which results from evaporation of water from the salt flows through an outlet 56 of the plate system to a compartment 58 located below insulating base member 22.

As the water being distilled flows over the undulations it will be in cavities which are only about 90 mm deep. This depth of the water in the cavities between the undulations 30 and the thin layer of water which flows over the undulations 30 will result in fast heating and evaporation of the water. Since deposits can form on the plate system, a single panel or a plurality of adjacent panels made of blackened flexible plastic or the like, such as isobutyl, can be used to cover the surface of the plate system and can be attached thereto in a removable manner so that the plastic covering can be taken out and the deposits thereon removed.

As disclosed in Ser. No. 44,901, now U.S. Pat. No. 4,323,052, a plurality of units such as unit 10 can be provided operating in series and/or in parallel.

In accordance with another feature of the embodiment of FIG. 1, storage areas are located beneath the insulating base member 22. Shown is a storage area 58 for brine 54, a storage area 60 for the fluid 37 circulated in the double plate conduit 12, another storage area 62 for concentrated brine and a storage area 52 for the condensate 46. By storing the various fluids beneath the insulating base member 22, further insulation and retention of heat within the system is obtained.

Circulation of the various fluids can be carried out in the manner described in my aforementioned application Ser. Nos. 915,001, U.S. Pat. No. 4,270,981, and 44,901, U.S. Pat. No. 4,323,052, and furthermore, as described herein.

In accordance with another aspect of the invention, the fluid 37 circulated between the double plate conduit 12 is circulated, before being stored in the compartment 60, through a conduit 64 disposed between the upper part of the undulated plate system in a heat exchanging relationship therewith and the insulating base member 22. This allows for the transfer of heat from the collected condensate to the salt water as it is conducted over the undulated plate system. The fluid 37 flows from the tank 40 through valve 38 and conduit 65 to the double plate conduit 12. The fluid 37 leaves the double plate conduit 12 through outlet conduit 26 and is conducted to the heat exchange conduit 64 below the plate system 28 via conduit 66. From conduit 64, the fluid 37 is conducted to compartment 60 by conduit 67. From compartment 60, the fluid is pumped back to tank 40 through conduit 68, heat exchanger 69 and conduit 70. Heat can be transferred from fluid 37 to the water to be distilled by means of heat exchange conduit 64 and heat exchanger 68.

The lower plate 34 of conduit 12 is heated by the heat of condensation released when the water vapor condenses on that plate, and the plate transfers the released heat to the fluid 37 circulating between the plates 34 and 36. Thus, most of the heat of condensation can be recovered. The lower plate 34 is also heated by the heat of radiation from the undulated plate system over which water is cascading, and also by the heat convected from the mass of vapor and air flowing towards the double plate conduit 12. The solar rays transmitted through the transparent double plate conduit are partially absorbed by the fluid 37 flowing between the plates. The fluid flowing through the double plate conduit 12 can be heated to selected temperatures by regulating the flow of fluid therethrough. For example, the fluid 37 can be distilled water, and, for a water vapor temperature up to 75° C., water entering at 25° C. can be heated to 65° C. at the outlet. The quantity of water required to recover the heat of condensation for a temperature change of 25° C. to 65° C., i.e., a difference of 40° C., will be about eight times the quantity of water condensed for an efficiency of, for example, 60%. To recover 60%, the 540 cal/liter released by the condensing vapor requires 8.1 times the quantity of water to absorb that released heat for a 40° C. change as follows: (0.6)(540)/40=8.1. This heat can heat a quantity of water to be distilled from 20° C. to 55° C., a 35° C. difference, at 90% efficiency, which is 8.3 times the quantity of water condensed as follows: (0.9)(324)/35=8.3, where 324 represents 60% of 540.

The water 37 circulated in conduct 64 below the undulated plate system which is at about 65° C. will heat the incoming water to be distilled from about 30° C. to about 50° C. This will also act to cool the water 37 flowing through conduit 64 from about 65° C. to about 50° C., for example. After the water 37 is conducted through conduit 64 under the undulated plate system, it can be passed through a heat exchanger 69 to further preheat the water 42 to be distilled from 20° C. to about 30° C., for example. The water 37 will be cooled to about 25° C. and can then be stored in the compartment 60 under the insulating base member 22. In other words, part of the heat recovered by the water 37 between the plates 34, 36 of the conduit 12 will heat incoming water 42 to be distilled through the metallic bottom plates of the plate system 28, and part of the heat will preheat the water to be distilled in the heat exchanger 69. This will allow a reduction of the quantity of water 37 which has to be introduced into the conduit 12 of the apparatus by 2/3, i.e. only five times instead of eight times the quantity of water directly vaporized will have to flow through the conduit 12. This arrangement also allows a decrease in the height of the water 37 necessary to circulate the water between the plates 34, 36 of conduit 12.

In the embodiment illustrated in FIG. 1, the plates 34 and 36 are spaced by a distance which corresponds to the desired thickness of the fluid 37 to be circulated between the plates. The system in FIG. 1 can be pressured. However, the amount of pressure the system has to withstand is relatively low as the angle of inclination is maintained to be less than or equal to about 25°.

The brine 54 entering compartment 58 may be conducted to compartment 62 via conduit 71. The brine may be introduced into the means for conducting 20 via conduits 71 and 43 so as to recover the heat in the brine, i.e. utilize the heated brine to heat incoming salt water.

Heat can also be recovered from the condensate by a heat exchanger, for example, not shown in FIG. 1. This recovered heat can also be used to heat the water to be distilled.

Valving is provided as necessary to obtain the flows described herein.

Figure 2:
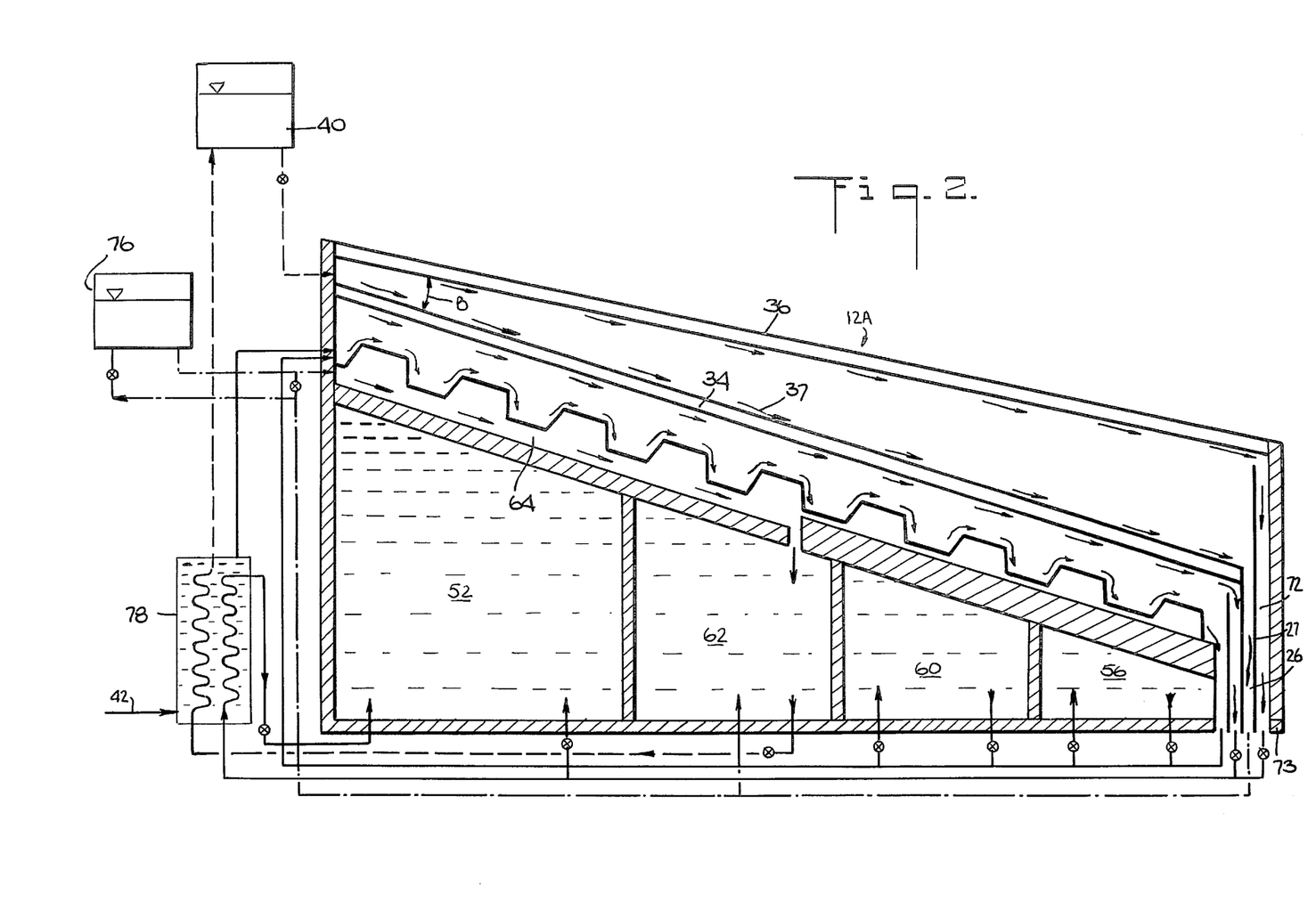
FIG. 2 is a cross-sectional elevation view through distillation apparatus according to another embodiment of the present invention.

The embodiment illustrated in FIG. 2 is similar to the embodiment in FIG. 1 except that the double plates 34 and 36 of the conduit 12A are spaced by a distance greater than the thickness desired of the fluid 37 flowing between the plates. It is also possible to eliminate the upper plate 36 altogether. The system of FIG. 2 operates similar to that of FIG. 1 except that the double plate conduit 12A essentially need not be pressurized. Instead, the fluid flowing in the conduit is merely conducted over the lower plate 34.

The upper plate 36 may be parallel to or disposed at an angle to the lower plate 34. As shown in FIG. 2, the upper plate 36 is disposed at an angle with the lower plate 34. The upper plate 36 extends beyond the lower plate 34 and an additional compartment 72 formed by walls 27 and 73 is provided below the lower end of the upper plate. Wall 27 separates compartment 72 from outlet 26. The arrangement in FIG. 2 allows for the evaporation and condensation of liquid 37 circulated between the double plate conduit system. The evaporated liquid can condense on the lower surface of upper plate 36 and the condensate can flow along the lower surface to be discharged into the compartment 72. Advantageously, the liquid circulated between the double plate system in FIG. 2 is water to be distilled so that the condensate obtained is distilled water which can be mixed with the condensate collected from the lower surface of the lower plate 34. The vapor produced by the water flowing between the double plate conduits will be heated for example to about 65° C. The water vapor will be condensed on the bottom of plate 36 producing additional condensate at 50° C, for example. The hot condensate will also be used together with the condensate from the lower plate to preheat the incoming distilled water, as described in connection with FIG. 1.

Another advantage of the arrangement in FIG. 2 is the reduction of heat losses by radiation and convection by virtue of the spaced upper plate 36. The temperature of the upper plate will be lower than that of closely spaced parallel plates by possibly 20° C. to 50° C. To this effect, the top and bottom plates may form an angle B of, for example, 8°, thus increasing the insulating space between the two plates. This system does not have to withstand high pressures and the perimeter of the top and bottom plates need only hold the water.

Two tanks or reservoirs will preferably be supplied for the fluids, one tank (76) for the fluid collected at 70° C. and one tank (40) for the fluid collected at 25° C. The use of tank 76 reduces pressure requirements for conduit 64.

A double coil heat exchanger 78 provides for heating of the water 42 to be distilled by the fluid 37 and the condensate. While double heating of the water to be distilled is preferred, it is not indispensable.

Compartment 52 is for condensate from plate 34 and 36; compartment 62 is for fluid 37; and compartments 60 and 56 are for brine.

If desired, the fluid circulated in conduit 12 can be mixed with products such as glycol.

Figure 3:
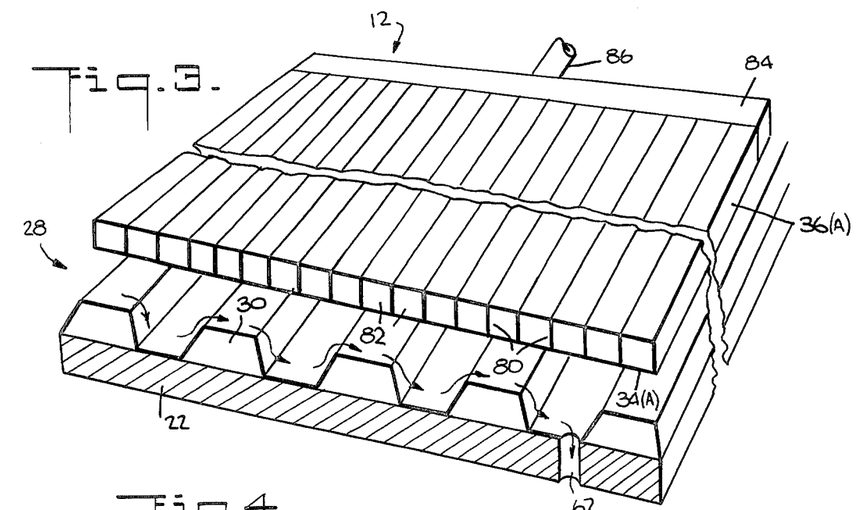
FIG. 3 is a perspective view in cross-section of distillation apparatus, according to another embodiment of the invention utilizing conduit means having a plurality of passages.

Referring now to FIG. 3, the double plate conduit 12B may comprise a plurality of elongated adjacently disposed upper plates 36A or a single upper plate 36, and a corresponding plurality of lower plates 34A or single lower plate 34. A plurality of transparent elongated supports 80 can be disposed between the (individual) upper and lower plates to form individual passages or conduits 82 through which the fluid is passed. Where individual plates are employed, the supports can be disposed at the intersection of adjacent plates. The lower plate or plates, as in the embodiments previously described, will act to transfer the heat of condensation to the fluid being circulated between the plates. Each of the conduits 82 may be communicated at each end with a common conduit 84 having an inlet 86 as in FIG. 3, so as to provide for a single collector compartment with all the conduits 82 being connected in parallel. All the fluid passes through double plate conduit 12B and over the plate system 28 once. Where the fluid is distilled water, it can be heated from about 25° C. to about 40° C., for example.

In FIG. 3, the conduits 82 are shown running parallel to the undulations 30. The conduits 82 may be arranged to run longitudinally in the apparatus, i.e., perpendicular to the undulations.

Figure 4:
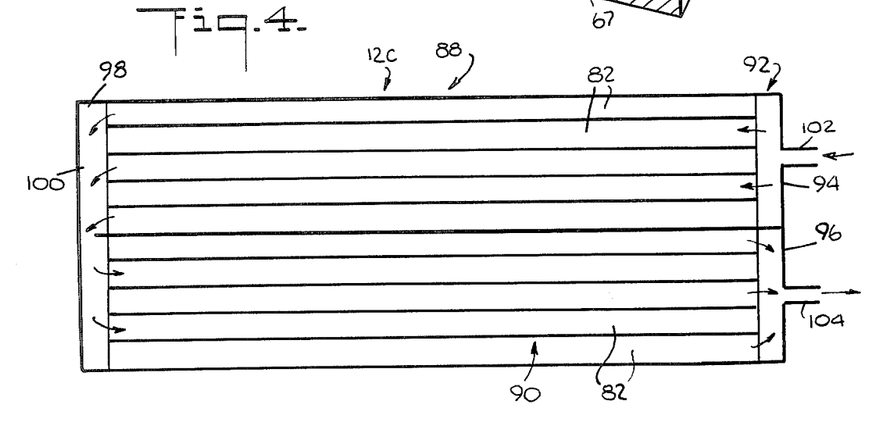
FIG. 4 is a top view of conduit means similar to the conduit means of FIG. 3 showing a go-return flow arrangement.

In FIG. 4, the individual conduits 82 of double plate conduit 12C are connected in a go-return arrangement. Double plate conduit 12C is divided into two compartments 88 and 90. The conduits 82 of compartment 88 are connected together at one end 92 by conduit 94 and the conduits 82 of compartment 90 are connected together at the same end 92 by conduit 96. At the other end 98 of the double plate conduit 12C, all the conduits 82 are connected together by conduit 100. An inlet 102 is provided for compartment 88 and an outlet 104 is provided for compartment 90. Fluid flows in one direction in compartment 88 and in the opposite direction in compartment 90. Compartments 88 and 90 are thus connected in series and fluid passing through conduit 12C can be heated to a higher temperature. Distilled water, for example, entering compartment 88 at 25° C., for example, can be heated to 40° C. as the fluid passes over the plate system a first time in one direction. the 40° C. water introduced into compartment 90 can be heated to 60° C., for example, as it passes over the plate system a second time in the opposite direction. As in FIG. 3, the conduits 82 may be parallel or perpendicular to the undulations.

Figure 5:
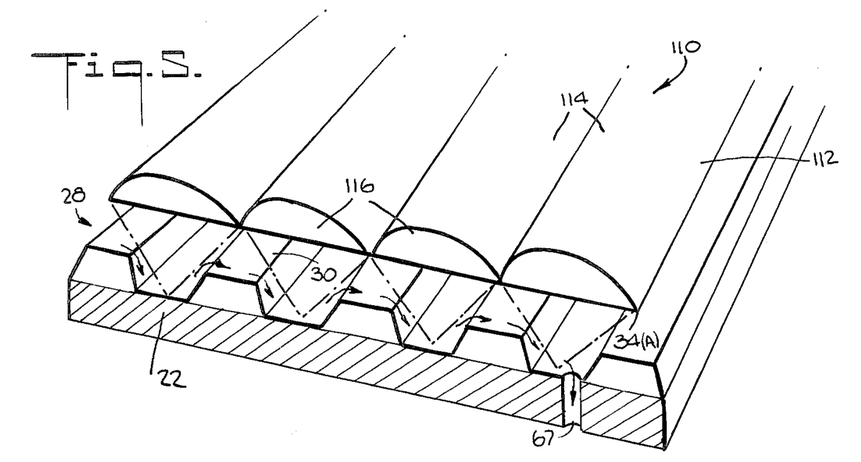
FIG. 5 is a perspective view in cross-section of distillation apparatus according to another embodiment of the invention utilizing fluid lens means.

According to another embodiment of the invention, the double plate conduit system may be replaced by fluid lenses 110 which include an upper plate 112 made up of a plurality of convex sections 114 and a single lower plate 34 or a corresponding plurality 34A of lower plates. The convex portions 114 of the upper plate can be arranged so as to form a plurality of fluid lenses, each forming an individual conduit 116 for the flow of fluid therethrough. For example, the convex portions can be 16 cm wide and spaced by approximately 6 cm at the point of widest separation. The individual fluid lenses can concentrate the solar energy into the valleys between the undulations 30 on the plate system over which the water to be distilled is cascading. This will provide higher temperatures for heating the water and can provide for faster evaporation in the areas in which the solar energy is concentrated. The radius R of the fluid lenses can be for example: $R=\frac{1}{2}(d+L^2/4d)$, where L is the aperture of the fluid lens and d is the spacing at the point of widest separation between the upper and lower plates. The focal distance is defined by $F=R/N-1$, where N is the refractory index (1.45 for example). R can then be calculated to be equal to 8.3 cm and F to be equal to 18 cm.

If desired, an array of photoelectric cells may be disposed in valleys between undulations where the fluid lens concentrates the solar energy as described in Ser. No. 44,901 now U.S. Pat. No. 4,323,052.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from spirit and scope of the invention.

What is claimed is:

1. Apparatus for distilling liquids utilizing solar energy comprising:
   (a) means for conducting the liquid to be distilled at an acute angle with respect to the horizontal;
   (b) conduit means transparent to visible light for conducting a liquid therethrough in a heat exchange relationship with the conduit means, the conduit means being disposed above said means for conducting so as to conduct liquid therethrough at an acute angle with respect to the horizontal generally in the same direction as the liquid conducted by the means for conducting and allow solar energy to pass through said conduit means and be received without substantial concentration in or on the means for conducting;
   (c) means supplying liquid to said conduit means for assisting the condensation on said conduit means of liquid evaporated from said means for conducting and absorbing heat released by the condensing liquid, the supplying means providing sufficient liquid to the conduit means and the conduit means being structured such that a substantial amount of liquid passes through the conduit means unevaporated and absorbs heat released by the liquid condensing on the conduit means while assisting the condensation on said conduit means of liquid evaporated from said means for conducting; and
   (d) means for collecting the condensed liquid.

2. Apparatus in accordance with claim 1 wherein the means for conducting and the conduit means are generally elongated and generally coextensive.

3. Apparatus in accordance with claim 1 wherein the conduit means comprises a double plate conduit having upper and lower plates transparent to visible light, the upper and lower plates being spaced to permit a thin flow of liquid therebetween, the lower plate being disposed above the means for conducting so as to provide space therebetween.

4. Apparatus in accordance with claim 1 wherein the conduit means comprises a plate transparent to visible light disposed above the means for conducting so as to provide space therebetween, and means disposed about the perimeter of the plate for forming in cooperation with the plate an enclosure for liquid flowing on the plate.

5. Apparatus in accordance with claim 3 or 4 and comprising means cooperating with the lower of said plates for closing off said space.

6. Apparatus in accordance with claim 4 and comprising another plate transparent to visible light disposed above said plate so as to form a double plate conduit.

7. Apparatus in accordance with claim 6, wherein the plates are spaced by a distance so as to exceed substantially the depth of the liquid flowing between the plates and allow liquid to be evaporated between the plates and condense on an upper of the two plates.

8. Apparatus in accordance with claim 7 and comprising means for collecting liquid condensed on the lower surface of said upper plate.

9. Apparatus in accordance with claim 7 wherein the plates are parallel.

10. Apparatus in accordance with claim 7 wherein the plates form an acute angle.

11. Apparatus in accordance with claim 1 wherein said means for conducting comprises an undulated plate system.

12. Apparatus in accordance with claim 11 wherein said plate system has undulations with a depth on the order of up to 90 mm separated by approximately by 120 mm.

13. Apparatus in accordance with claim 1 wherein said means for collecting the condensed liquid includes a compartment which is disposed below a portion of said means for conducting.

14. Apparatus in accordance with claim 13 and comprising heat exchange means connected to said compartment for transferring heat to the liquid to be distilled before the liquid is conducted over said means for conducting.

15. Apparatus in accordance with claim 1 and further comprising means for collecting the liquid conducted over said means for conducting, said means for collecting being disposed below a portion of said means for conducting.

16. Apparatus in accordance with claim 15 and wherein said means for collecting comprises a compartment, said apparatus including means connecting said compartment with said means for conducting for supplying liquid in said compartment to said means for conducting.

17. Apparatus in accordance with claim 1 and comprising means for collecting the liquid conducted through said conduit means, said means for collecting being disposed below a portion of the means for conducting.

18. The apparatus in accordance with claim 1 or 17 comprising heat exchanging means connected to said conduit means and to a source of liquid to be distilled, said heat exchange means transferring heat from the liquid passing through the conduit means to the liquid to be distilled, the heat exchanging means including means for connecting the heat exchanging means to the means for conducting to transfer thereto liquid to be distilled.

19. Apparatus in accordance with claim 1 or 17 comprising additional conduit means disposed below said means for conducting and in a heat exchanging relationship therewith.

20. Apparatus in accordance with claim 19 and comprising means connecting said additional conduit means and said conduit means for conducting said liquid through said additional conduit means.

21. Apparatus for distilling liquid utilizing solar energy comprising:
(a) means for conducting the liquid to be distilled at an acute angle with respect to the horizontal;
(b) fluid lens means disposed above said means for conducting for concentrating solar energy on the means for conducting, said fluid lens means comprising a planar lower plate and an upper plate having a plurality of elongated convex sections, the upper and lower plates being spaced, and elongated supports being disposed between the upper and lower plates extending parallel to sides of adjacent convex sections, each convex section together with a portion of the bottom plate and the associated supports forming a conduit through which a liquid can flow in a heat exchange relationship with said lower plate, said fluid lens means being disposed to conduct the liquid therethrough at an acute angle with respect to the horizontal generally in the same direction as the liquid conducted by the means for conducting;
(c) means supplying liquid to said fluid lens means for assisting the condensation on said fluid lens means of liquid evaporated from said means for conducting and absorbing heat released by the condensing liquid; and
(d) means for collecting the condensed liquid.

22. Apparatus in accordance with claim 21 and comprising an array of photovoltaic cells disposed on said means for conducting at a location to receive concentrated solar energy from said fluid lens means.

23. Apparatus in accordance with claim 22 and further including means encapsulating said array and means supplying a cooling fluid to said encapsulating means to cool said array.

24. Apparatus in accordance with claim 1 wherein said conduit means comprises parallel upper and lower plates spaced by elongated supports, the elongated supports and the upper and lower plates forming individual passages for liquid to be passed through the conduit means.

25. Apparatus in accordance with claim 24 and including means for connecting said passages so as to provide a parallel liquid flow through said conduit means in one direction.

26. Apparatus in accordance with claim 24 and including means for connecting said passages so as to provide a serial liquid flow through said conduit means in opposed directions.

27. Apparatus in accordance with claim 1 wherein said liquid to be distilled comprises water.

28. Apparatus in accordance with claim 27 wherein said liquid passing through the conduit means comprises distilled water.

29. Apparatus in accordance with claim 28 wherein said distilled water comprises condensate obtained from said water to be distilled, said apparatus also including means for cooling said condensate prior to supplying the condensate to said conduit means.

30. Apparatus in accordance with claim 27 wherein said liquid comprises water to be distilled.

31. Apparatus in accordance with claim 11 and further including an insulating base member below said plate system.

32. Apparatus in accordance with claim 31 and further including at least one storage means disposed below said insulating member for storing fluids used in said apparatus.

33. Apparatus in accordance with claim 32 wherein said plate system is made out of a metal selected from the group consisting of stainless steel, steel and copper.

34. Apparatus in accordance with claim 11 wherein said plate system is covered with an anticorrosive material.

35. Apparatus in accordance with claim 11 and further including a blackened flexible material disposed over at least part of said plates in a manner such that it is removable to permit removing deposits therefrom.

36. Apparatus in accordance with claim 3 and including a tank filled with said liquid connected with and disposed above said conduit means so as to supply liquid to said conduit means at substantially low pressure.

37. Apparatus in accordance with claim 19 and including a tank filled with said liquid connected to and disposed above said additional conduit means so as to supply liquid to said additional conduit means at substantially low pressure.

38. Apparatus in accordance with claim 1 and including heat exchange means for transferring heat from the condensate of the liquid to the liquid to be distilled.

39. Apparatus in accordance with claim 1 and including means for introducing a concentrate of the liquid being distilled into the means for conducting after the liquid being distilled has been conducted over the means for conducting.

40. Apparatus in accordance with claim 1 wherein said direction is downwardly inclined.

* * * * *